United States Patent
Chu et al.

(10) Patent No.: US 11,638,238 B2
(45) Date of Patent: Apr. 25, 2023

(54) TRIGGER FRAME BASED METHOD AND DEVICE FOR COMMUNICATIONS

(71) Applicant: NXP USA, Inc., Austin, TX (US)

(72) Inventors: Liwen Chu, San Ramon, CA (US); Rui Cao, Sunnyvale, CA (US); Sudhir Srinivasa, Los Gatos, CA (US); Hongyuan Zhang, Fremont, CA (US); Young Hoon Kwon, Laguna Niguel, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 148 days.

(21) Appl. No.: 17/139,656

(22) Filed: Dec. 31, 2020

(65) Prior Publication Data

US 2021/0227529 A1 Jul. 22, 2021

Related U.S. Application Data

(60) Provisional application No. 62/957,174, filed on Jan. 4, 2020, provisional application No. 62/980,213, filed on Feb. 22, 2020, provisional application No. 62/984,562, filed on Mar. 3, 2020, provisional application No. 63/033,776, filed on Jun. 2, 2020, provisional application No. 63/048,699, filed on Jul. 7, 2020, provisional application No. 63/075,364, filed on Sep. 8, 2020, provisional application No. 63/023,226, filed on May 11, 2020.

(51) Int. Cl.
*H04W 4/00* (2018.01)
*H04W 72/04* (2023.01)

(52) U.S. Cl.
CPC ................... *H04W 72/0406* (2013.01)

(58) Field of Classification Search
CPC .............. H04W 72/0406; H04W 84/12; H04L 1/1812; H04L 1/0071; H04L 1/08
See application file for complete search history.

(56) References Cited

U.S. PATENT DOCUMENTS 10,014,917 B2  7/2018  Chu et al.
10,305,659 B2 * 5/2019  Chu .................. H04L 5/0007
(Continued)

OTHER PUBLICATIONS

IEEE, "IEEE P802.11ax™/D6.0", Draft Standard for Information technology—Telecommunications and information exchange between systems Local and metropolitan area networks Specific requirements, Nov. 2019, 780 pgs.

*Primary Examiner* — Abdelnabi O Musa

(57) ABSTRACT

Embodiments of a method and an apparatus for multi-link data transmission are disclosed. In an embodiment, a method for communications involves at a first device, transmitting, to a second device, a trigger frame that solicits at least one Physical layer Protocol Data Unit (PPDU) for uplink transmission, wherein the trigger frame includes a standard-compatible common info field that includes a trigger type field and a standard-compatible user info list field that includes at least one user info field, wherein the trigger frame includes a solicited Trigger-Based (TB) type indicator in a field in the trigger frame other than the trigger type field, and receiving, at the first device, at least one PPDU from the second device in response to the solicited TB type indicator that was transmitted in the trigger frame by the first device.

20 Claims, 17 Drawing Sheets

(56) References Cited

U.S. PATENT DOCUMENTS

| | | | |
|---|---|---|---|
| 11,271,686 B2* | 3/2022 | Chu | ................... H04L 1/1893 |
| 2016/0315796 A1* | 10/2016 | Kwon | ................ H04L 27/2666 |
| 2016/0330732 A1* | 11/2016 | Moon | ................... H04B 7/0639 |
| 2017/0142659 A1* | 5/2017 | Noh | ................. H04W 52/0245 |
| 2019/0104513 A1* | 4/2019 | Chu | ................. H04W 74/0816 |
| 2019/0124556 A1* | 4/2019 | Verma | ................. H04W 72/042 |
| 2019/0238288 A1* | 8/2019 | Liu | ...................... H04L 5/0091 |
| 2020/0037356 A1* | 1/2020 | Lou | .................... H04W 72/121 |
| 2021/0266931 A1 | 8/2021 | Kwon et al. | |
| 2021/0336720 A1 | 10/2021 | Chu et al. | |
| 2022/0095347 A1* | 3/2022 | Huang | ............. H04W 72/1278 |
| 2022/0217027 A9 | 7/2022 | Cao et al. | |

* cited by examiner

| B0 | B3 B4 | B15 B16 | B17 | B16 B19 B20 B21 | B22 | B23 | B25 B26 | B27 | B28 B33 B34 B35 | B36 | B37 B52 | B53 | B54 B62 | B63 | VARIABLE |
|---|---|---|---|---|---|---|---|---|---|---|---|---|---|---|---|
| TRIGGER TYPE 302 | UL LENGTH 304 | MORE TF 306 | CS REQUIRED 308 | UL BW / GI AND LTF TYPE 310 / 312 | MU-MIMO LTF MODE 314 | NUMBER OF HE-LTF SYMBOLS AND MIDAMBLE PERIODICITY 316 | UL STBC 318 | LDPC EXTRA SYMBOL SEGMENT 320 | AP TX POWER 322 / PRE-FEC PADDING FACTOR 324 | PE DISAMBI- GUITY 326 | UL SPATIAL REUSE 328 | DOPPLER 330 | UL HE- SIG-A2 RESERVED 332 | RESERVED 334 | TRIGGER DEPENDENT COMMON INFO 336 |

300

B54 — FURTHER COMMON INFO INDICATION(=0) 332-1

B55 — B62 — ADDITIONAL COMMON INFO 332-2

| TRIGGER TYPE SUBFIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| 8 | RANGING |
| 9 -15 | RESERVED |

FIG. 4A 400-2

| TRIGGER TYPE SUBFIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| 8 | RANGING |
| 9 | ENHANCED TRIGGER |
| 10-15 | RESERVED |

FIG. 4B 400-3

| TRIGGER TYPE SUBFIELD VALUE | TRIGGER FRAME VARIANT |
|---|---|
| 0 | BASIC |
| 1 | BEAMFORMING REPORT POLL (BFRP) |
| 2 | MU-BAR |
| 3 | MU-RTS |
| 4 | BUFFER STATUS REPORT POLL (BSRP) |
| 5 | GCR MU-BAR |
| 6 | BANDWIDTH QUERY REPORT POLL (BQRP) |
| 7 | NDP FEEDBACK REPORT POLL (NFRP) |
| 8 | RANGING |
| 9 | ENHANCED BASIC |
| 10 | ENHANCED BFRP |
| 11 | ENHANCED MU-BAR |
| 12 | ENHANCED MU-RTS |
| 13 | ENHANCED BSRP |
| 14 | ENHANCED BQRP |
| 15 | ENHANCED NFRP |

FIG. 4C

| AID12 502 | RU ALLOCATION 504 | UL FEC CODING TYPE 506 | UL HE-MLS 508 | UL DCM 510 | SS ALLOCATION/ RA-RU INFORMATION 512 | UL TARGET RSSI 514 | RESERVED 516 | TRIGGER DEPENDENT USER INFO 518 |
|---|---|---|---|---|---|---|---|---|
| B0  B11 | B12  B19 | B20  B21 | B22  B23 | B24  B25 | B26  B31 | B32  B38 | B39 | VARIABLE |

| B0<br>(160MHz index) | B1<br>(80MHz index) | B2-B9 | RU ALLOCATION |
|---|---|---|---|
| 0/1 | 0/1 | 0-88 | RU<=996 |
| 0/1 | 0/1 | 89-95 | Reserved for new RU<=996*2 |
| 0/1 | 0 | 96-109 | 996*2=>RU>996 |
| 0/1 | 1 | 96-109 | Reserved for new 996*2=>RU>996 |
| 0/1 | 0/1 | 110-127 | Reserved for new 996*2=>RU>996 |
| 0 | 0 | 128-142 | RU>996*2 |
| 0/1 | 1 | 128-142 | Reserved for new RU>996*2 |
| 0/1 | 0/1 | 143-255 | Reserved for new RU>996*2 |

FIG. 6A 600-2

| B0 (160MHz Idx) | B1-B8 | RU ALLOCATION |
|---|---|---|
| 0/1 | 0-166 (within 160) | RU<=996*2 |
| 0/1 | 167-223 | Reserved for new RU<=996*2 |
| 0 | 223-241 | RU>996*2 |
| 0 | 242-255 | Reserved for new RU>996*2 |
| 1 | 223-255 | Reserved for RU>996*2 |

FIG. 6B 600-3

| B0 (80MHz Idx) | B1 (160MHz Idx) | B2-B8 | RU ALLOCATION |
|---|---|---|---|
| 0/1 | 0/1 | 0-71 (within 80) | RU<242 |
| R | 0/1 | 72-94 | RU<=996*2 |
| R | 0/1 | 94-108 | Reserved for RU<=996*2 |
| R | 0 | 109-127 | RU>996*2 |
| R | 1 | 109-127 | Reserved for RU>996*2 |

FIG. 6C

| FRAME CONTROL 702 | DURATION 704 | RA 706 | TA 708 | COMMON INFO 710 | COMMON INFO FOR SPECIFIC TB TYPE1 712-1 | COMMON INFO FOR SPECIFIC TB TYPE2 712-2 | USER INFO LIST FOR SPECIFIC TB TYPE1 714-1 | USER INFO LIST FOR SPECIFIC TB TYPE2 714-2 | ...... 716 | FCS 718 |

| FRAME CONTROL 802 | DURATION 804 | RA 806 | TA 808 | HE COMMON INFO 810 | HE USER INFO LIST 812 | HE DELIMITER 814 | EHT COMMON INFO 816 | EHT USER INFO LIST 818 | EHT+ COMMON INFO 820 | EHT+ USER INFO LIST 822 | ...... 824 | FCS 826 |

| FRAME CONTROL 802 | DURATION 804 | RA 806 | TA 808 | HE COMMON INFO 810 | HE DELIMITER 814 | EHT COMMON INFO 816 | EHT USER INFO LIST 818 | EHT+ COMMON INFO 820 | EHT+ USER INFO LIST 822 | ...... 824 | FCS 826 |

800-1

| FRAME CONTROL 802 | DURATION 804 | RA 806 | TA 808 | HE COMMON INFO 810 | HE DELIMITER + EHT COMMON INFO 815 | EHT USER INFO LIST 818 | EHT+ COMMON INFO 820 | EHT+ USER INFO LIST 822 | ...... 824 | FCS 826 |

TRIGGER FRAME BASED METHOD AND DEVICE FOR COMMUNICATIONS

CROSS-REFERENCE TO RELATED APPLICATIONS

This application is entitled to the benefit of U.S. Provisional patent Application Ser. No. 62/957,174, filed on Jan. 4, 2020, and U.S. Provisional Patent Application Ser. No. 62/980,324, filed on Feb. 22, 2020, and U.S. Provisional Patent Application Ser. No. 62/984,562, filed on Mar. 3, 2020, and U.S. Provisional Patent Application Ser. No. 63/033,776, filed on Jun. 2, 2020, and U.S. Provisional Patent Application Ser. No. 63/048,699, filed on Jul. 7, 2020, and U.S. Provisional patent Application Ser. No. 63/075,364, filed on Sep. 8, 2020, each of which is incorporated by reference herein.

BACKGROUND

In multi-link communications, devices, e.g., access points (AP) devices or non-AP devices, e.g., station (STA) devices or client STAs, can transmit various types of information, such as different frame formats for some features or operations for communication between devices. As an example, a wireless AP device in a multi-link Basic Service Set (BSS) may wirelessly transmit a trigger frame to transmit format information and to solicit responses from associated devices. However, as the protocols for trigger frame transmission change, there is a need to efficiently account for different frame formats.

SUMMARY

Embodiments of a method and an apparatus for multi-link data transmission are disclosed. In an embodiment, a method for communications involves at a first device, transmitting, to a second device, a trigger frame that solicits at least one Physical layer Protocol Data Unit (PPDU) for uplink transmission, wherein the trigger frame includes a standard-compatible common info field that includes a trigger type field and a standard-compatible user info list field that includes at least one user info field, wherein the trigger frame includes a solicited Trigger-Based (TB) type indicator in a field in the trigger frame other than the trigger type field, and receiving, at the first device, at least one PPDU from the second device in response to the solicited TB type indicator that was transmitted in the trigger frame by the first device.

In an embodiment, the trigger frame uses a High-Efficiency (HE) trigger frame format.

In an embodiment, a reserved field of the standard-compatible common info field indicates that the first device solicits an EHT TB PPDU.

In an embodiment, a specific association ID (AID) value of an AID12 subfield of the standard-compatible user info field announces solicited PPDU formats.

In an embodiment, the standard-compatible user info field with a specific AID12 subfield is used to carry common information for multiple solicited devices, wherein, a specific AID12 value is 2007, and wherein, an uplink (UL) High Efficiency (HE) Signal-A2 (UL HE-SIG-A2) Reserved subfield is used to carry common information different from a reserved value for multiple solicited devices.

In an embodiment, the standard-compatible user info field with the specific AID12 value carries an EHT signal (SIG) value of the solicited EHT TB PPDU.

In an embodiment, the UL HE SIG-A2 Reserved subfield of the standard-compatible common info field announces PPDU formats.

In an embodiment, the standard-compatible user info field comprises a Resource Unit (RU) allocation that uses 9-bits for signaling at least one of a one RU and multiple RUs for the second device(s).

In an embodiment, 1-bit of the 9-bits indicates whether the RU is in at least one of a primary 160 MHz channel and a secondary 160 MHz channel if the solicited PPDU is more than 160 MHz.

In an embodiment, 1-bit of the 9-bits indicates whether the RU is in at least one of a primary 80 MHz channel and a secondary 80 MHz channel, and wherein, if the RU is in the secondary 160 MHz channel, a location infrequency of the primary 80 MHz channel and the secondary 80 MHz channel is the same as a location of the primary 80 MHz channel and the secondary 80 MHz channel of the primary 160 MHz channel.

In an embodiment, 1-bit of the 9-bits indicates whether a wider RU is in at least one of the primary 160 MHz channel and the secondary 160 MHz channel if multiple RUs for a single device covering at least one of the primary 160 MHz channel and the secondary 160 MHz channel are allocated to the single device.

In an embodiment, 1-bit of the 9-bits indicates whether a wider RU is in at least one of the primary 80 MHz channel and the secondary 80 MHz channel if multiple RUs for the single device covering at least one of the primary 80 MHz channel and the secondary 80 MHz channel are allocated to the single device.

In an embodiment, if an HE TB PPDU and a TB PPDU other than the HE TB PPDU are solicited by the trigger frame, the standard-compatible common info field announces common information for the HE TB PPDU and the standard-compatible user info field with specific AID12 value announces common information for the TB PPDU other than the HE TB PPDU.

In an embodiment, if multiple TB PPDUs with different TB types are solicited by the Trigger frame, the standard-compatible common info field announces the frequency location if different TB types are present.

In an embodiment, if multiple TB PPDUs with different TB types are solicited by the trigger frame, the standard-compatible user info field with the specific AID12 value that solicits the TB PPDU from the second device with EHT TB type is placed before the standard-compatible user info field with the specific AID12 value that solicits TB PPDU from second devices with next-generation (NG) EHT TB type.

An embodiment of a first device is disclosed. The first devices includes a processor configured to transmit, to a second device, a trigger frame that solicits at least one Physical layer Protocol Data Unit (PPDU) for uplink transmission, wherein the trigger frame includes a standard-compatible common info field that includes a trigger type field and a standard-compatible user info list field that includes at least one user info field, wherein the trigger frame includes a solicited Trigger-Based (TB) type indicator in a field in the trigger frame other than the trigger type field and receive at least one PPDU from the second device in response to the solicited TB type indicator that was transmitted in the trigger frame by the first device.

Another embodiment of a method for multi-link communications is disclosed. The method involves at a first device, formatting a trigger frame that solicits at least one of a Trigger-Based (TB) Aggregated-Physical layer Protocol Data Unit (PPDU) and a PPDU for uplink transmission, wherein the trigger frame includes a standard-compatible common info field for a specific TB type and a standard-compatible user info list field for a specific TB type, wherein the trigger frame includes a solicited Trigger-Based (TB) type indicator in a field in the trigger frame other than the trigger type field, transmitting, to a second device, the trigger frame that solicits at least one of the TB A-PPDU and the PPDU for uplink transmission, and receiving, at the first device, at least one PPDU from the second device in response to the solicited TB type indicator that was transmitted in the trigger frame by the first device.

In an embodiment, formatting the trigger frame includes using an EHT trigger frame format.

In an embodiment, formatting the trigger frame includes reusing a HE trigger frame format.

In an embodiment, formatting the trigger frame includes using a cascaded trigger frame format.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 3 depicts an example of a Common Info field that may be used in accordance with an embodiment of the invention.

FIG. 4A depicts an example of a Trigger Type subfield value table that may be used in accordance with an embodiment of the invention.

FIG. 4B depicts another example of a Trigger Type subfield value table that may be used in accordance with an embodiment of the invention.

FIG. 4C depicts another example of a Trigger Type subfield value table that may be used in accordance with an embodiment of the invention.

FIG. 5 depicts an example of a User Info field that may be used in accordance with an embodiment of the invention.

FIG. 6A depicts an example of an RU Allocation subfield value table that may be used in accordance with an embodiment of the invention.

FIG. 6B depicts another example of an RU Allocation subfield value table that may be used in accordance with an embodiment of the invention.

FIG. 6C depicts another example of an RU Allocation subfield value table that may be used in accordance with an embodiment of the invention.

FIG. 7B depicts another example of a trigger frame that may be used in accordance with an embodiment of the invention.

FIG. 8A depicts another example of a trigger frame that may be used in accordance with an embodiment of the invention.

FIG. 8B depicts another example of a trigger frame that may be used in accordance with an embodiment of the invention.

FIG. 9B depicts another example of a trigger frame that may be used in accordance with an embodiment of the invention.

FIG. 10 depicts another example of a trigger frame that may be used in accordance with an embodiment of the invention.

Throughout the description, similar reference numbers may be used to identify similar elements.

DETAILED DESCRIPTION

Figure 1:
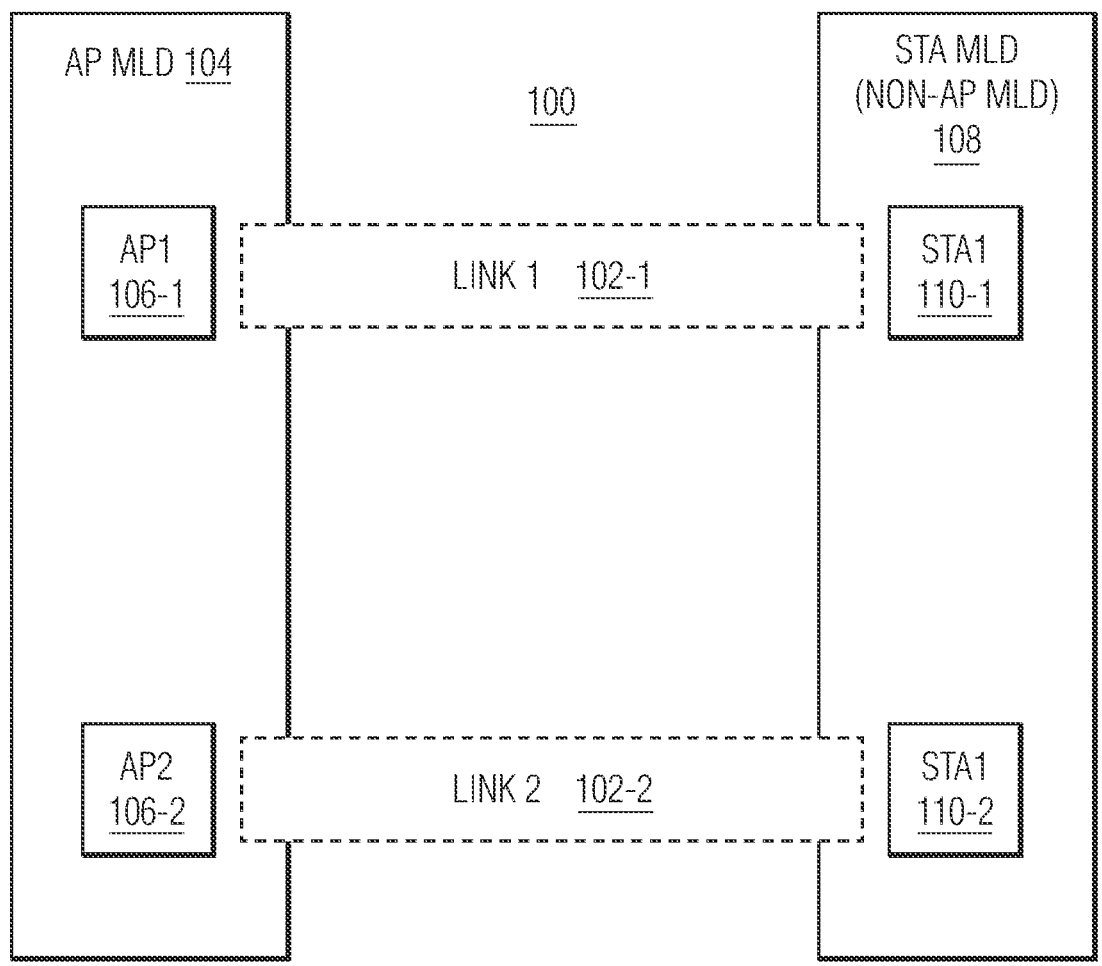
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a device, e.g., an access point (AP) device, of a wireless local area network (WLAN) transmits data to at least one associated device, e.g., station (STA) or client STA. The AP device is configured to operate with associated STA devices according to at least a first communication protocol. The first communication protocol may be referred to herein as an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and or a next-generation communication protocol may be referred to herein as "non-legacy" features. In some embodiments of the multi-link communications system described herein, different associated STAs within range of an AP operating according to the EHT communication protocol are configured to operate according to at least one other communication protocol, which defines operation in the same frequency band as the AP, but are generally affiliated with lower data throughputs. The lower data throughput communication protocols (e.g., IEEE 802.11n, IEEE 802.11ac, or IEEE 802.11ax) may be collectively referred to herein as "legacy" communication protocols. Legacy communication protocols may further include High-Efficiency (HE) communication protocol, High-Throughput (HT) communication protocol, and Very High-Throughput (VHT) communication protocol.

FIG. 1 depicts a multi-link communications system that is used for wireless (e.g., WiFi) communications. In the embodiment depicted in FIG. 1, a multi-link communications system 100 includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, implemented as access points (APs) 106-1 and 106-2. In some embodiments, the AP MLD 104 implements upper layer Media Access Control (MAC) functionalities (e.g., beacon, association establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, the AP MLD 104 connects to a local area network (e.g., a LAN) and/or to a backbone network (e.g., the Internet) through a wired connection. In some embodiments, an AP is a wireless AP that connects to the LAN and/or to the backbone network (e.g., the Internet) through the wired connection and wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 106-1 or 106-2 of the AP MLD 104 may operate in a different frequency band. For example, the AP 106-1 may operate in a 2.4 gigahertz (GHz) frequency band and the AP 106-2 may operate in a 5 GHz frequency band. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP stations (STAs) 110-1 and 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a wireless device that wirelessly connect to wireless APs. For example, the STA MLD 108 may be implemented in a laptop, a desktop personal computer (PC), a mobile phone, or other wireless device that supports at least one WLAN communications protocol. In some embodiments, the non-AP STA MLD 108 is a wireless device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. Each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links 102-1 and 102-2. For example, each of the non-AP STAs 110-1 or 110-2 communicates with an AP 106-1 or 106-2 via corresponding communication links 102-1 or 102-2. Although the STA MLD 108 is shown in FIG. 1 as including two non-AP STAs, other embodiments of the STA MLD 108 may include more than two non-AP STAs. In addition, although the AP MLD 104 communicates (e.g., wirelessly communicates) with the STA MLD 108 via multiple links 102-1 and 102-2 in other embodiments, the AP MLD 104 may communicate (e.g., wirelessly communicates) with the STA MLD 108 via more than two communication links.

The EHT communication protocol (i.e., IEEE 802.11be standard) is a next version of the communications protocol that succeeds the IEEE HE 802.11ax standard. Additional future versions of the IEEE 802.11 communication protocol may succeed IEEE 802.11ax or IEEE 802.11be. It is desirable that future versions of the communication protocol provide backward compatibility and support interoperability with legacy versions of the IEEE 802.11 communication protocol. Thus, a trigger frame compliant with the IEEE 802.11be communication protocol may be distinguishable from a trigger frame that is compliant with a legacy communication protocol. Because a trigger frame solicits an uplink (UL) Physical layer Protocol Data Unit (PPDU), an UL PPDU type is fixed by a trigger frame type, creating the need for transmission that is supportive of various PPDU formats. For example, an EHT Trigger-based (TB) PPDU or a future TB PPDU may be implemented by a device operating according to a non-legacy communication protocol. In addition, one trigger frame can solicit multiple TB PPDUs (e.g., a HE TB PPDU and an EHT TB PPDU or a HE TB PPDU and a TB PPDU other than HE TB PPDU) in an Aggregated-PPDU (A-PPDU). STA devices may also have the ability to support punctured operation where more than one Resource Unit (RU) will be allocated to a single STA. Furthermore, another requirement may be that one trigger frame can solicit a TB PPDU whose bandwidth is more than 160 MHZ.

In accordance with an embodiment of the invention, a technique for multi-link communications is described herein. The technique involves, at a first device, transmitting, to a second device, a trigger frame that solicits at least one PPDU for uplink transmission, in which the trigger frame includes a standard-compatible common info field that includes a trigger type field and a standard-compatible user info list field that includes at least one User Info field, in which the trigger frame includes a solicited TB type indicator in a field in the trigger frame other than the trigger type field, and receiving, at the first device, at least one PPDU from the second device in response to the solicited TB type indicator that was transmitted in the trigger frame by the first device. By including a solicited TB type indicator in a field in the trigger frame other than trigger type field, additional trigger type signaling can be implemented without the frame formats of the legacy communication protocols. Thus, the technique allows for continued interoperability between legacy and non-legacy devices when soliciting various types of PPDUs in multi-link communications.

A trigger frame, which may be transmitted by a first device, which is operating under the IEEE 802.11be communication protocol, to another device operating under at least one of a legacy communication protocol and a non-legacy communication protocol, is described in further detail below with reference to FIG. 2.

Figure 2:
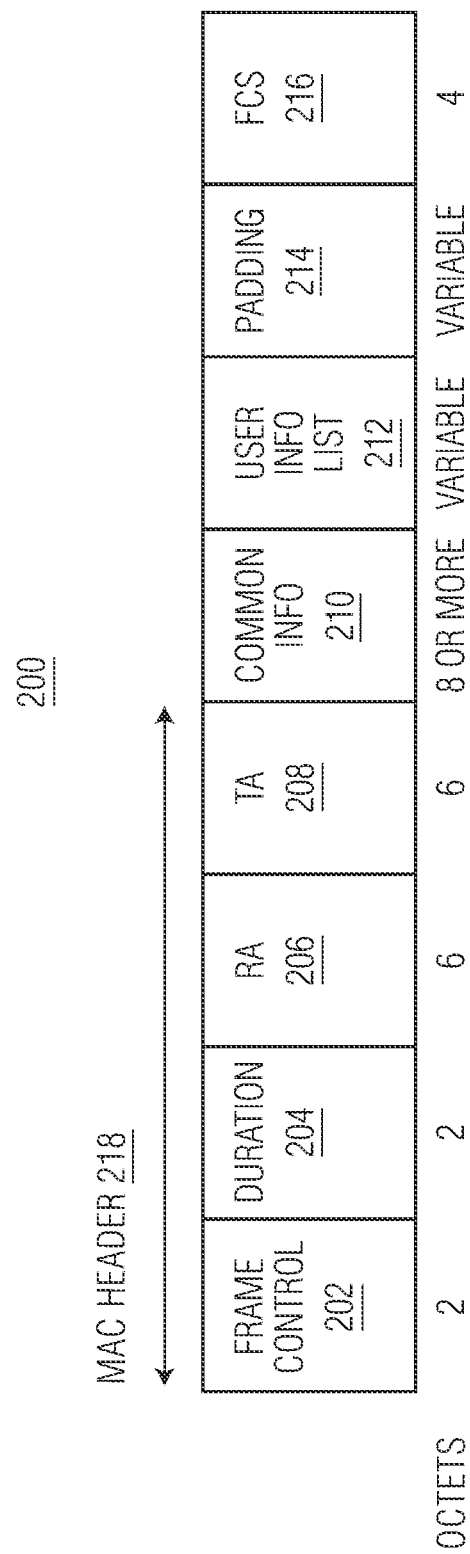
FIG. 2 depicts an example of a trigger frame that may be used in accordance with an embodiment of the invention.

FIG. 2 depicts an example of a trigger frame that may be used in accordance with an embodiment of the invention. In FIG. 2, the trigger frame may be used by a first device operating according to an EHT communication protocol, such that the trigger frame may be transmitted to a second device operating according to at least one of a non-legacy communication protocol and a legacy communication protocol. With reference to FIG. 2, one embodiment of the invention may involve a trigger frame, implemented as trigger frame 200, including a MAC header 218 having a Frame Control field 202 that is 2 octets, a Duration field 204 that is 2 octets, a Resource Allocation (RA) field 206 that is 6 octets, and a Transmit Address (TA) field 208 that includes address information of the first device. In such an embodiment, the TA field 208 is followed by a Common Info field 210 that is 8 or more octets, a User Info List field 212 that is a variable number of octets, a Padding field 214 that is variable number of octets, and a Frame Check Sequence (FCS) field 216 that is 4 octets. In some embodiments, the Common Info field 210 may be a standard-compatible common info field that includes a trigger type field. In some embodiments, the User Info List field 212 may be a standard-compatible user info list field. For example, the standard-compatible common info field and the standard-compatible user info list field are compatible with the standard. Furthermore, the trigger frame 200 may also include a solicited TB type indicator in a field in the trigger frame other than the trigger type field.

With reference to FIG. 2, lengths and fields included in the Common Info field 210 as well as lengths and fields included in the User Info List field 212 may be flexibly defined (e.g., different from the length of the IEEE 802.11ax communication protocol). In some embodiments, the lengths of the Common Info field and the User Info field in the trigger frame are the same lengths as in the IEEE 802.11ax communication protocol. In some embodiments, in an enhanced Basic Trigger for soliciting an EHT (or Next-Generation Extremely High-Throughput (NG-EHT) etc.) TB PPDU, a specific User Info field includes a one octet Trigger Dependent User Info subfield (besides B0 to B39) which has a reserved value or a specific value for a Basic Trigger. In some embodiments, in an enhanced Multiple user-Block Acknowledgement Request (MU-BAR) for soliciting the EHT (or NG-EHT etc.) TB PPDU, the specific User Info field includes the Trigger Dependent User Info subfield (except for B0 to B39) that is related to a single STA with Block Acknowledgement Request (BAR) request from a single Traffic Identifier (TID). Alternatively, the Trigger Dependent User Info subfield (except for B0 to B39) that is related to the single STA can include a BAR request from multiple TIDs. In some embodiments, in an enhanced Beam Forming Report Poll (BFRP) Trigger for soliciting the EHT (or NG-EHT etc.) TB PPDU, the specific User Info field includes a one octet Trigger Dependent User Info subfield (except for B0 to B39) which has a reserved value or a specific value for enhanced BFRP. In some embodiments, in an enhanced Buffer Status Report Poll (BSRP) Trigger and an enhanced Bandwidth Query Report Poll (BQRP) Trigger for soliciting the EHT (or NG-EHT etc.) TB PPDU, the specific User Info field includes bits B0 to B39.

With further reference to FIG. 2, the trigger frame 200 may be used for a solicited TB PPDU type indication when transmitted by a first device to a second device. Three techniques that may be utilized with the trigger frame for the solicited TB PPDU type indication are described herein. According to a first technique, a reserved field (B63) being equal to 1 (different from the reserved value) in a Common Info field of the trigger frame indicates that an AP solicits an EHT TB PPDU. According to a second technique, an UL HE signal-A2 (SIG-A2) Reserved subfield (or UL Spatial Reuse subfield) is redefined to announce the specific PPDU format. For example, the specific format may be at least one of an EHT TB orthogonal frequency division-multiple access (OFDMA) or multiple-user multiple-input multiple-output (MU-MIMO)) PPDU format and an NG-EHT TB (OFDMA or MU-MIMO) PPDU format. According to a third technique, a User Info field with a specific association ID (AID) value (e.g., AID 2007 or AID 2043) in a AID12 subfield announces a specific PPDU format. For example, the specific format may be at least one of an EHT TB (OFDMA or MU-MIMO) PPDU format and an NG-EHT TB (OFDMA or MU-MIMO) PPDU format. Furthermore, the first technique, the second technique, and the third technique can be combined to carry new common information other than new TB PPDU types.

FIG. 3 depicts an example of a Common Info field that may be used in accordance with an embodiment of the invention. In particular, FIG. 3 depicts subfields of the Common Info field 210 in the trigger frame 200 shown in FIG. 2. With reference to FIG. 3, a Common Info field, implemented as Common Info field 300, is shown. The Common Info field as shown in FIG. 3 includes a Trigger Type subfield 302 that is bits B0 to B3 (4-bits), an UL Length subfield 304 that is bits B4 to B15 (12-bits), a More TF subfield 306 that is bit B16 (1-bit), a Channel Sensing (CS) Required subfield 308 that is bit B17 (1-bit), an UL bandwidth subfield 310 that is bits B18 to B19 (2-bits), a Guard Interval (GI) And Long Training Field (LTF) Type subfield 312 that is bits B20 to B21 (2-bits), a MU-MIMO LTF Mode subfield 314 that is bits B22 (1-bit), a Number of HE-LTF Symbols and Mid-amble Periodicity subfield 316 that is bits B23 to B25 (3-bits), an UL Space Time Block Coding (STBC) subfield 318 that is bit B26 (1-bit), a Low Density Parity Check (LDPC) Extra Symbol Segment subfield 320 that is bit B27 (1-bit), an AP Transmit (TX) Power subfield 322 that is bits B28 to B33 (6-bits), a Pre-Forward Error Correction (FEC) Padding Factor subfield 324 that is bits B34 to B35 (2-bits), a Packet Extension (PE) Disambiguity subfield 326 that is bit B36 (1-bit), an UL Spatial Reuse subfield 328 that is bits B37 to B52 (16-bits), a Doppler subfield 330 that is bit B53 (1-bit), an UL HE-SIG-A2 Reserved subfield 332 that is bits B54 to B62 (9-bits), a Reserved subfield 334 that is bit B63 (1-bit), and a Trigger Dependent Common Info subfield 336 that is a variable number of bits. In some embodiments, the UL HE-SIG-A2 Reserved subfield 332 that is bits B54 to B62 may further include a Further Common Info Indication (=0) subfield 332-1 (shown by a dashed box) that is bit B54 (1-bit) and an Additional Common Info subfield 332-2 (shown by a dashed box) that is bits B55 to B62 (8-bits).

With reference to FIG. 3, in some embodiments, the first technique, in which a reserved field (B63) being equal to 1 in a Common Info field of the trigger frame indicates that an AP solicits an EHT TB PPDU, may be implemented in the Common Info field 300. In such an embodiment, a trigger type (e.g., Basic, BFRP, BQRP, MU-BAR, MU-Request-to-Send (RTS) etc.) is reused and lengths of the Common Info field and the User Info field are kept the same as in the IEEE 802.11ax communication protocol. Thus, in such an embodiment, the Reserved subfield 334 that is B63 (1-bit) in Common Info field 300 may be equal to 1, allowing the Common Info field 210 of the trigger frame 200 to indicate that the AP solicits the EHT TB PPDU. In some embodiments, the Common Info field 300 may be a standard-compatible common info field that includes a trigger type field. For example, the standard-compatible common info field is compatible with the standard.

With further reference to FIG. 3, in some embodiments, the second technique, in which an UL HE-SIG-A2 Reserved subfield (or UL Spatial Reuse subfield) is redefined to announce the solicited specific PPDU format, may be implemented in the Common Info field 300. In such an embodiment, a trigger type (e.g., Basic, BFRP, BQRP, MU-BAR, MU-RTS etc.) is reused and lengths of Common Info field and User Info field are kept the same as in the IEEE 802.11ax communication protocol. In such an embodiment, the UL HE-SIG-A2 Reserved subfield 332 in the Common Info field 300 as shown in FIG. 3 may be redefined to include the Further Common Info Indication subfield 332-1 (shown by a dashed box) that is B54 (1-bit) which is always set to 0, and the Additional Common Info subfield 332-2 (shown by a dashed box) that is B55 to B62 (8-bits). In such an embodiment, the other subfields and the lengths of the other subfields in Common Info field 300 are not changed and the Additional Common Info subfield 332-2 can indicate at least one of three features. In some embodiments, the Additional Common Info subfield 332-2 can indicate a TB PPDU type (e.g., EHT PPDU, EHT_NG TB PPDU etc.), but an MU-RTS still solicits a non-HT duplicated Clear-to-Send (CTS) PPDU in a static punctured channel, dynamic punctured channel, or non-punctured channel. In some embodiments, the Additional Common Info subfield 332-2 can indicate an Additional bandwidth Indication (e.g., 320 MHz/ 160+160 MHz channels etc.), but the 320 MHz/160+160 MHz channels may also be indicated in other fields (e.g., Reserved field 334 that is B63). In some embodiments, the Additional Common Info subfield 332-2 can indicate other common information. Thus, in such an embodiment, the UL HE-SIG-A2 Reserved subfield 332 in the Common Info field 300 may be repurposed, allowing the Common Info field 210 of the trigger frame 200 to indicate that the AP solicits the EHT TB PPDU. In some embodiments, the Common Info field 300 may be a standard-compatible common info field that includes a trigger type field. For example, the standard-compatible common info field is compatible with the standard.

With further reference to FIG. 3, in some embodiments, 10-bits of the Common Info field 300 may be reused for triggering an EHT PPDU (e.g., can be within an A-PPDU), such that the UL HE-SIG-A2 Reserved subfield 332 includes 9-bits and the Reserved subfield 334 includes 1-bit. In some embodiments, additional bits may include channel puncture information (12-16-bits), a bandwidth extension (1-bit), and a Number of HT-LTF (NLTF) extension (1-bit). For triggering a mixed HE and EHT/EHT+UL PPDU, the UL Length subfield 304 may signal a length based on the IEEE 802.11ax communication protocol for a TB PPDU (i.e., LENGTH %==1). In addition, to trigger a STA for transmitting an EHT PPDU, the UL Length subfield 304 may be set as "UL LENGTH+2". Thus, the Common Info field 300 achieves extended trigger type signaling within standard-compatible common fields.

In some embodiments, the Trigger Type subfield 302 of the Common Info field 300 may be used as a solicited TB type indicator transmitted in a trigger frame by a device to solicit at least one PPDU for uplink transmission. In some embodiments, the Trigger Type subfield values are the same as the Trigger Type subfield values defined in the IEEE 802.11ax communication protocol. In some embodiments, the Trigger Type subfield values include one new Trigger Type subfield value, such that additional extended trigger subtypes are indicated in the Trigger Dependent Common Info subfield. In some embodiments, the Trigger Type subfield values include multiple new Trigger Type subfield values.

A Trigger Type subfield value table, which may be used by a first device operating according to the IEEE 802.11be communication protocol to indicate the device's trigger frame variant when transmitting a trigger frame to a second device operating under at least one of a legacy communication protocol and a non-legacy communication protocol, is described in further detail below with reference to FIGS. 4A-4C.

FIG. 4A depicts an example of a Trigger Type subfield value table that may be used in accordance with an embodiment of the invention. In particular, FIG. 4A depicts Trigger Type subfield encoding definitions that may be implemented in the Trigger Type subfield 302 of the Common Info field 300 shown in FIG. 3. With reference to FIG. 4A, Trigger Type subfield definitions used in accordance with an embodiment of the invention may be the same as the Trigger Type subfield definition used in the IEEE 802.11ax communication protocol. As an example, a Trigger Type subfield value table, implemented as Trigger Type subfield value table 400-1, may include a Trigger Type subfield value (shown in the left column) and a corresponding trigger frame variant (shown in the right column), such that the corresponding trigger frame variant indicates the trigger type. In such an example, a Trigger Type subfield value of 0 (e.g., a binary value) indicates a Basic trigger type, a Trigger Type subfield value of 1 indicates a BFRP trigger type, a Trigger Type subfield value of 2 indicates a MU-BAR trigger type, a Trigger Type subfield value of 3 indicates a MU-RTS trigger type, a Trigger Type subfield value of 4 indicates a BSRP trigger type, a Trigger Type subfield value of 5 indicates a GroupCast with Retries (GCR) MU-BAR trigger type, a Trigger Type subfield value of 6 indicates a BQRP trigger type, a Trigger Type subfield value of 7 indicates a Neighbor Discovery Protocol (NDP) Feedback Report Poll (NFRP) trigger type, a Trigger Type subfield value of 8 indicates a Ranging trigger type, and a Trigger Type subfield value in the range of 9-15 indicates a Reserved trigger type. In such an embodiment, the Trigger Type subfield values 0, 1, 2, 4, 5, and 6 are trigger types used by EHT APs to solicit an EHT TB type PPDU or a NG-EHT TB type PPDU. In such an embodiment, the Trigger Type subfield value of 3 that indicates a MU-RTS trigger type is used to solicit a CTS in greater than 160 MHz non-HT duplicate PPDU or a CTS in punctured non-HT duplicate PPDU. In some embodiments, a new solicited TB PPDU is indicated via subfields other than the Trigger Type subfield, for example, through the User Info field with specific value in AID12 subfield or through the UL HE-SIG-A2 Reserved subfield.

FIG. 4B depicts another example of a Trigger Type subfield value table that may be used in accordance with an embodiment of the invention. In particular, FIG. 4B depicts Trigger Type subfield encoding definitions that may be implemented in the Trigger Type subfield 302 of the Common Info field 300 shown in FIG. 3. With reference to FIG. 4B, Trigger Type subfield definitions used in accordance with an embodiment of the invention may include a new Trigger Type subfield value to indicate an Enhanced Trigger type for soliciting an EHT (or NG-EHT) TB PPDU. As an example, a Trigger Type subfield value table, implemented as Trigger Type subfield value table 400-2, may include a Trigger Type subfield value (shown in the left column) and a corresponding trigger frame variant (shown in the right column), such that the corresponding trigger frame variant indicates the trigger type. In such an example, a Trigger Type subfield value of 0 (e.g., a binary value) indicates a Basic trigger type, a Trigger Type subfield value of 1 indicates a BFRP trigger type, a Trigger Type subfield value of 2 indicates a MU-BAR trigger type, a Trigger Type subfield value of 3 indicates a MU-RTS trigger type, a Trigger Type subfield value of 4 indicates a BSRP trigger type, a Trigger Type subfield value of 5 indicates a GCR MU-BAR trigger type, a Trigger Type subfield value of 6 indicates a BQRP trigger type, a Trigger Type subfield value of 7 indicates a NFRP trigger type, a Trigger Type subfield value of 8 indicates a Ranging trigger type, a Trigger Type subfield value of 9 indicates an Enhanced Trigger type, and a Trigger Type subfield value in the range of 10-15 indicates a Reserved trigger type. In some embodiments, variant triggers (e.g., Enhanced Basic Trigger, Enhanced BFRP Trigger, Enhanced MU-BAR Trigger, Enhanced MU-RTS Trigger, Enhanced BSRP Trigger, Enhanced BQRP Trigger, and Enhanced NFRP Trigger) are indicated in a Trigger Dependent Common Info field. In such an embodiment, the Trigger Dependent Common Info field may be the Trigger Dependent Common Info field 336 of the Common Info field 300 shown in FIG. 3. In such an embodiment, the Common Info field can be redefined.

FIG. 4C depicts another example of a Trigger Type subfield value table that may be used in accordance with an embodiment of the invention. In particular, FIG. 4C depicts Trigger Type subfield encoding definitions that may be implemented in the Trigger Type subfield 302 of the Common Info field 300 shown in FIG. 3. With reference to FIG. 4C, Trigger Type subfield definitions used in accordance with an embodiment of the invention may include multiple new Trigger Type subfield values to indicate an Enhanced Basic Trigger, an Enhanced BFRP Trigger, an Enhanced MU-BAR Trigger, an Enhanced MU-RTS Trigger, an Enhanced BSRP Trigger, an Enhanced BQRP Trigger, and an Enhanced NFRP Trigger. As an example, a Trigger Type subfield value table, implemented as Trigger Type subfield value table 400-3, may include a Trigger Type subfield value (shown in the left column) and a corresponding trigger frame variant (shown in the right column), such that the corresponding trigger frame variant indicates the trigger type. In such an example, a Trigger Type subfield value of 0 (e.g., a binary value) indicates a Basic trigger type, a Trigger Type subfield value of 1 indicates a BFRP trigger type, a Trigger Type subfield value of 2 indicates a MU-BAR trigger type, a Trigger Type subfield value of 3 indicates a MU-RTS trigger type, a Trigger Type subfield value of 4 indicates a BSRP trigger type, a Trigger Type subfield value of 5 indicates a GCR MU-BAR trigger type, a Trigger Type subfield value of 6 indicates a BQRP trigger type, a Trigger Type subfield value of 7 indicates a NFRP trigger type, a Trigger Type subfield value of 8 indicates a Ranging trigger type, a Trigger Type subfield value of 9 indicates an Enhanced Basic trigger type, a Trigger Type subfield value of 10 indicates an Enhanced BFRP trigger type, a Trigger Type subfield value of 11 indicates an Enhanced MU-BAR trigger type, a Trigger Type subfield value of 12 indicates an Enhanced MU-RTS trigger type, a Trigger Type subfield value of 13 indicates an Enhanced BSRP trigger type, a Trigger Type subfield value of 14 indicates an Enhanced BQRP trigger type, and a Trigger Type subfield value of 15 indicates an Enhanced NFRP trigger type.

FIG. 5 depicts an example of a User Info field that may be used in accordance with an embodiment of the invention. In particular, FIG. 5 depicts subfields of the User Info List field 212 in the trigger frame 200 shown in FIG. 2. With reference to FIG. 5, a User Info field, implemented as User Info field 500, is shown. The User Info field as shown in FIG. 5 includes an AID12 subfield 502 that is bits B0 to B11 (12-bits), an RU Allocation subfield 504 that is bits B12 to B19 (8-bits), an Uplink Forward Error Correction (ULFEC) Coding Type subfield 506 that is bit B20 (1-bit), an UL HE-Multilayer Switch (MLS) subfield that is bits B21 to B24 (4-bits), an UL Dual Carrier Modulation (DCM) subfield 510 that is bit B25 (1-bit), a Space Stream (SS) Allocation/RA-RU Information subfield 512 that is bits B26 to B31 (6-bits), an UL Target Received Signal Strength Indicator (RSSI) subfield 514 that is bits B32 to B38 (7-bits), a Reserved subfield 516 that is bit B39 (1-bit) and a Trigger Dependent User Info subfield 518 that is a variable number of bits. In some embodiments, the User Info field 500 may be a standard-compatible user info field that is compatible with the standard. In such an embodiment, the lengths and fields included in the User Info field may be flexibly defined (e.g., different from the length of the IEEE 802.11ax communication protocol).

With reference to FIG. 5, in some embodiments, the third technique, in which a User Info field with a specific AID value (e.g., AID 2007 or AID 2043) in the AID12 subfield announces a specific PPDU format, such that the User Info field may be User Info field 500 and the AID12 subfield may be the AID12 subfield 502. As an example, the specific format may be at least one of an EHT TB (OFDMA or MU-MIMO) PPDU format and an NG-EHT TB (OFDMA or MU-MIMO) PPDU format. In such an embodiment, information in an EHT (NG-EHT) SIG of a solicited EHT (NG-EHT) TB PPDU can be carried in the User Info field with the specific AID value. In such an embodiment, other additional information can also be announced. For example, other additional information that can be announced may include that when there is more than 160 MHz of bandwidth that exists, there may be a 20 MHz Channel Bitmap that announces available 20 MHz channels for puncture operations.

With further reference to FIG. 5, in some embodiments, several subfields of the User Info field 500 that carries information for a STA (e.g., when AID12 does not include a specific value) may be repurposed for soliciting an EHT TB PPDU part of a triggered PPDU. In some embodiments, the repurposed subfields of the User Info field 500 may include at least one of the SS Allocation/RA-RU Information subfield 512 and the Reserved subfield 516. In one embodiment, the SS Allocation/RA-RU Information subfield may be repurposed in accordance with at least one of two options described herein. According to a first SS Allocation/RA-RU Information subfield option, the SS Allocation/RA-RU Information subfield may be 8-bits (e.g., starting SS (4-bits)+Number of SS (4-bits)). According to a second SS Allocation/RA-RU Information subfield option, the SS Allocation/RA-RU Information subfield may be 7-bits (e.g., SU/MU (1-bit)+SS Allocation (6-bits)). In one embodiment, the SS Allocation (6-bits) for a SU may be 4-bits+2 reserved-bits. In another embodiment, the SS Allocation (6-bits) for a MU may be SS (4-bits)+NSS (2-bits).

With further reference to FIG. 5, in some embodiments, several subfields of the User Info field 500 that carries information for a STA (e.g., when AID12 does not include a specific value) may be repurposed for soliciting an EHT TB PPDU part of a triggered PPDU. In some embodiments, the repurposed subfields of the User Info field 500 may include at least one of the RU Allocation subfield 504 and the Reserved subfield 516. The RU Allocation subfield may be repurposed in accordance with at least one of three RU Allocation subfield options described herein to announce multiple RUs for a STA. According to a first RU Allocation subfield option, the RU Allocation subfield may implement a 10-bit field. According to a second RU Allocation subfield option, the RU Allocation subfield may implement a 9-bit field. According to a third RU Allocation subfield option, the RU Allocation subfield may implement an 8-bit field that may be combined with a reserved bit in a User Info field, such that the reserved bit is in the Reserved subfield of the User Info field.

An RU Allocation subfield value table, which may be used by a first device operating under the IEEE 802.11be communication protocol to announce multiple RUs to a STA when transmitting a trigger frame to a second device operating under at least one of a legacy communication protocol and a non-legacy communication protocol, is described in further detail below with reference to FIGS. 6A-6C.

FIG. 6A depicts an example of an RU Allocation subfield value table that may be used in accordance with an embodiment of the invention. In particular, FIG. 6A depicts RU Allocation subfield encoding definitions that may be implemented in the RU Allocation subfield 504 of the User Info field 500 shown in FIG. 5. With reference to FIG. 6A, RU Allocation subfield definitions used in accordance with the first RU Allocation subfield option are shown, in which the first RU Allocation subfield option implements a 10-bit field. In the first RU Allocation subfield option, 2-bits may be used to indicate an 80 MHz segment, 7-bits may be used to indicate a size and a location of a total 103 RU or a total 103 multiple RUs (MRU), and 1-bit may be reserved for future indications. As an example, an RU Allocation subfield value table, implemented as RU Allocation subfield value table 600-1, may include a first column, implemented via bit B0 (160 MHz index), a second column, implemented via bit B1 (80 MHz index), a third column, implemented via bits B2-B9, and fourth column, which defines the corresponding RU Allocation. In one embodiment, for an RU Allocation less than or equal to 996 (RU<=996), B0 (160 MHz index) may be 0/1, B1 (80 MHz index) may be 0/1, and B2-B9 may be in the range of 0-88. In one embodiment, for an RU Allocation Reserved for a new RU Allocation less than or equal to 996*2 (Reserved for new RU<=996*2), B0 (160 MHz index) may be 0/1, B1 (80 MHz index) may be 0/1, and B2-B9 may be 89-95. In one embodiment, for an RU Allocation less than or equal to 996*2 and greater than 996 (996*2=>RU>996), B0 (160 MHz index) may be 0/1, B1 (80 MHz index) may be 0, and B2-B9 may be 96-109. In one embodiment, for an RU Allocation Reserved for a new RU Allocation less than or equal to 996*2 and greater than 996 (Reserved for new 996*2=>RU>996), B0 (160 MHz index) may be 0/1, B1 (80 MHz index) may be 1, and B2-B9 may be 96-109. In another embodiment, for the RU Allocation Reserved for the new RU Allocation less than or equal to 996*2 and greater than 996 (Reserved for new 996*2=>RU>996), B0 (160 MHz index) may be 0/1, B1 (80 MHz index) may be 0/1, and B2-B9 may be 110-127. In one embodiment, for an RU Allocation greater than 996*2 (RU>996*2), B0 (160 MHz index) may be 0, B1 (80 MHz index) may be 0, and B2-B9 may be 128-142. In one embodiment, for an RU Allocation Reserved for a new RU Allocation greater than 996*2 (Reserved for new RU>996*2), B0 (160 MHz index) may be 0/1, B1 (80 MHz index) may be 1, and B2-B9 may be 128-142. In another embodiment, for the RU Allocation Reserved for the new RU Allocation greater than 996*2 (Reserved for new RU>996*2), B0 (160 MHz index) may be 0/1, B1 (80 MHz index) may be 0/1, and B2-B9 may be 143-255.

FIG. 6B depicts another example of an RU Allocation subfield value table that may be used in accordance with an embodiment of the invention. In particular, FIG. 6B depicts RU Allocation subfield encoding definitions that may be implemented in the RU Allocation subfield 504 of the User Info field 500 shown in FIG. 5. With reference to FIG. 6B, RU Allocation subfield definitions used in accordance with the second RU Allocation subfield option are shown, in which the second RU Allocation subfield option implements a 9-bit field. As an example, an RU Allocation subfield value table, implemented as RU Allocation subfield value table 600-2, may include a first column, implemented via bit B0 (160 MHz Idx), a second column, implemented via bits B1-B8, and a third column, which defines the corresponding RU Allocation. In one embodiment, for an RU Allocation less than or equal to 996*2 (RU<=996*2), B0 (160 MHz Idx) may be 0/1 and B1-B8 may be 0-160 (within 160). In one embodiment, for an RU Allocation Reserved for a new RU Allocation less than or equal to 996*2 (Reserved for new RU<=996*2), B0 (160 MHz Idx) may be 0/1 and B1-B8 may be 167-223. In one embodiment, for an RU Allocation greater than 996*2 (RU>996*2), B0 (160 MHz Idx) may be 0 and B1-B8 may be 223-241. In one embodiment, for an RU Allocation Reserved for a new RU Allocation greater than 996*2 (Reserved for new RU>996*2), B0 (160 MHz Idx) may be 0 and B1-B8 may be 242-255. In another embodiment, for the RU Allocation Reserved for an RU Allocation greater than 996*2 (Reserved for RU>996*2), B0 (160 MHz Idx) may be 1 and B1-B8 may be 223-255.

With reference to FIG. 6B, according to the second RU Allocation subfield option, the second RU Allocation subfield option may continuously order all RUs within a 160 MHz channel. In some embodiments, 1-bit (B0) may be used to indicate a primary 160 MHz channel (P160) and a secondary 160 MHz channel (S160) for an RU less than or equal to 996*2 (RU<=996*2). In such an embodiment, one additional bit (e.g., reserved bit (B39) in the User Info field) may be added to an 8-bit RU Allocation to support punctured RUs to a SU. In some embodiments, when multiple RUs are allocated to a STA, the bit for a P160 or a S160 indication can help indicate whether a bigger RU is in the P160 when two combined RUs are in both the P160 and the S160. Alternatively, in such an embodiment, when multiple RUs are allocated to the STA, the bit for the P160 or the S160 indication can help indicate whether a smaller RU is in the P160 when two combined RUs are in both the P160 and the S160. In some embodiments, 1-bit of B1 to B8 may be used to indicate a primary 80 MHz channel (P80) or a secondary 80 MHz channel (S80). In such an embodiment, in the secondary 160 MHz channel, the P80 and the S80 may have the same location as the P80 and the S80 in the primary 160 MHz channel. In some embodiments, when multiple RUs are allocated to the STA, the bit for a P80 or a S80 indication can help indicate whether a bigger RU is in the P80 when two combined RUs are in both the P80 and the S80. Alternatively, in such an embodiment, when multiple RUs are allocated to the STA, the bit for the P80 or the S80 indication can help indicate whether a smaller RU is in the P80 when two combined RUs are in both the P80 and the S80.

FIG. 6C depicts another example of an RU Allocation subfield value table that may be used in accordance with an embodiment of the invention. In particular, FIG. 6C depicts RU Allocation subfield encoding definitions that may be implemented in the RU Allocation subfield 504 of the User Info field 500 shown in FIG. 5. With reference to FIG. 6C, RU Allocation subfield definitions used in accordance with the third RU Allocation subfield option are shown, in which the third RU Allocation subfield option implements an 8-bit field that may be combined with a reserved bit in a User Info field, such that the reserved bit is in the Reserved subfield of the User Info field. As an example, an RU Allocation subfield value table, implemented as RU Allocation subfield value table 600-3, may include a first column, implemented via bit B0 (80 MHz Idx), a second column, implemented via bit B1 (160 MHz Idx), a third column, implemented via bits B2-B8, and a fourth column, which defines the corresponding RU Allocation. In one embodiment, for an RU Allocation less than 242 (RU<242), B0 (80 MHz Idx) may be 0/1, B1 (160 MHz Idx) may be 0/1, and B2-B8 may be 0-71 (within 80). In one embodiment, for an RU Allocation less than or equal to 996*2 (RU<=996*2), B0 (80 MHz Idx) may be R, B1 (160 MHz Idx) may be 0/1, and B2-B8 may be 72-94. In one embodiment, for an RU Allocation Reserved for an RU Allocation less than or equal to 996*2 (Reserved for RU<=996*2), B0 (80 MHz Idx) may be R, B1 (160 MHz Idx) may be 0/1, and B2-B8 may be 94-108. In one embodiment, for an RU Allocation greater than 996*2 (RU>996*2), B0 (80 MHz Idx) may be R, B1 (160 MHz Idx) may be 0, and B2-B8 may be 109-127. In one embodiment, for an RU Allocation Reserved for an RU Allocation greater than 996*2 (Reserved for RU>996*2), B0 (80 MHz Idx) may be R, B1 (160 MHz Idx) may be 1, and B2-B8 may be 109-127.

With reference to FIG. 6C, according to the third RU Allocation subfield option, B0 may use one reserved bit in the SS Allocation/RA-RU Information subfield 512 for a SU and B1-B8 may reuse existing RU Allocation bits. In some embodiments, B0 may indicate an 80 MHz index within a 160 MHz channel, B1 of B1-B8 may indicate a 160 MHz index for a 320 MHz PPDU, and B2-B8 may signal an RU pattern.

When a channel includes mixed PPDU formats (e.g., a first channel is an 80 MHz HE OFDMA, a second channel is an 80 MHz HE OFDMA, a third channel is an 80 MHz EHT OFDMA, and a fourth channel is an 80 MHz EHT OFDMA), an A-PPDU may be used to include mixed TB PPDUs (e.g., HE TB PPDU, EHT TB PPDU, NG-EHT TB PPDU etc.). To solicit a TB A-PPDU, a device may use a trigger frame. Formats of the EHT trigger frame for soliciting the TB A-PPDU may be in accordance to at least one of the three EHT trigger frame options described herein.

In accordance with an embodiment of the invention, a technique for multi-link communications is described herein. The technique comprises, at a first device, formatting a trigger frame that solicits at least one of a TB A-PPDU and a PPDU for uplink transmission, wherein the trigger frame includes a standard-compatible common info field for a specific TB type and a standard-compatible user info list field for a specific TB type, transmitting, to a second device, the trigger frame that solicits at least one of the TB A-PPDU and the PPDU for uplink transmission, and receiving, at the first device, at least one PPDU from the second device in response to the solicited TB type indicator that was transmitted in the trigger frame by the first device. Thus, the technique allows for continued interoperability between legacy and non-legacy devices when soliciting various types of PPDUs in multi-link communications.

According to a first EHT trigger frame option, an EHT trigger frame format is used, such that a new value in a Trigger Type subfield is defined, creating more format flexibility for EHT devices. In some embodiments, when using the first EHT trigger frame format, a trigger frame may be able to trigger an UL EHT PPDU, an EHT A-PPDU, and an EHT+A-PPDU, unless the trigger frame is in a downlink OFDMA. In some embodiments, when using the first EHT trigger frame format, a HE A-PPDU or an EHT A-PPDU may not be supported by using one trigger frame. In some embodiments, the first EHT trigger frame format may be used when no new value in a Trigger Type subfield is defined. The first EHT trigger frame format is described in further detail below with reference to FIG. 7A.

Figure 7A:
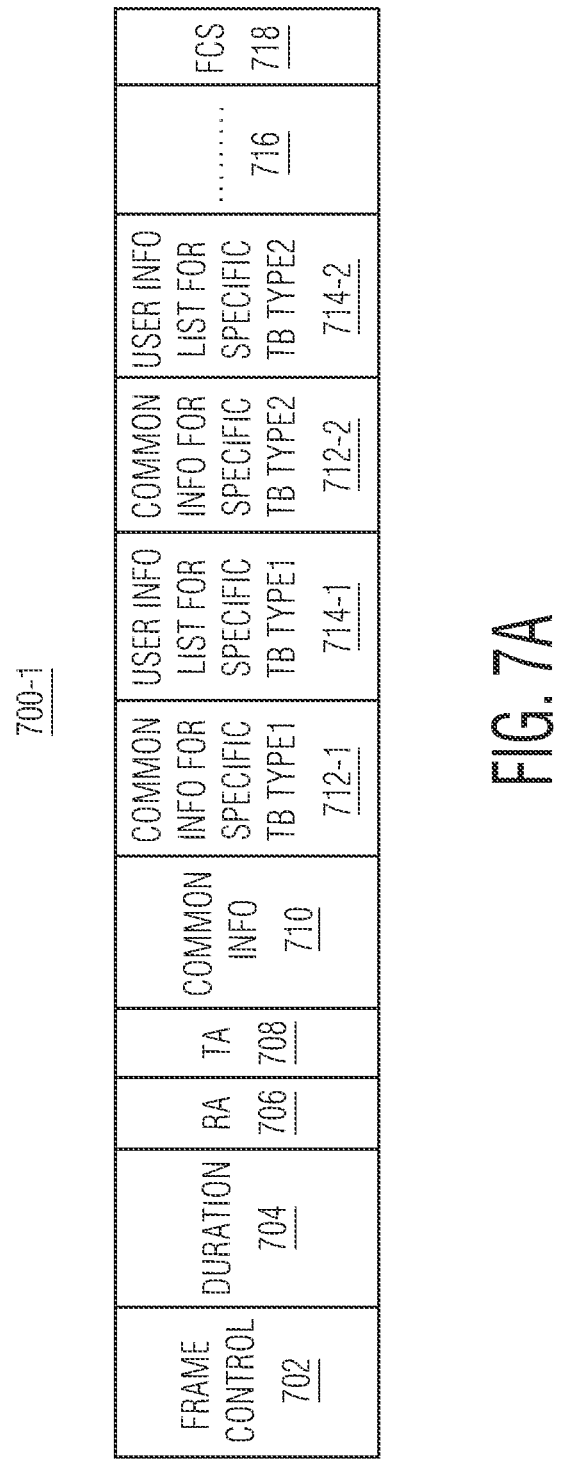
FIG. 7A depicts another example of a trigger frame that may be used in accordance with an embodiment of the invention.

FIG. 7A depicts another example of a trigger frame that may be used in accordance with an embodiment of the invention. In FIG. 7A, the trigger frame may be used by a first device operating according to an EHT communication protocol, such that the trigger frame may be transmitted to at least one second device operating according to at least one of a non-legacy communication protocol and a legacy communication protocol. With reference to FIG. 7A, one embodiment of the invention may involve a trigger frame, implemented as trigger frame 700-1, that includes a Frame Control field 702, a Duration field 704, a RA field 706, a TA field 708, a Common Info field 710, a Common Info for specific TB Type1 field 712-1, a User Info List for Specific TB Type1 field 714-1 that includes at least one User Info field (not shown), a Common Info for specific TB Type2 field 712-2, a User Info List for Specific TB Type2 field 714-2 that includes at least one User Info field (not shown), a repetition field 716, and an FCS field 718.

With reference to FIG. 7A, the Common Info field 710 may include information common to soliciting all TB types. In some embodiments, the Common Info field 710 may be removed when an EHT trigger frame format is defined (e.g., the new value of a Trigger Type is defined). In some embodiments, each Common Info field for a specific TB Type field (e.g., Common Info for Specific TB Type1 712-1 and Common Info for Specific TB Type2 712-2) is followed by the User Info List fields that solicit specific TB PPDUs (e.g., User Info List for Specific TB Type1 714-1 and User Info List for Specific TB Type2 714-2). In one embodiment, a Common Info for Specific TB Type field can be identified by a specific value in an AID12 field (not shown) when reusing HE Trigger frame format. In another embodiment, the Common Info for Specific TB Type field can be a new field defined with any suitable length when defining the EHT Trigger frame format. In such an embodiment, the Common Info for Specific TB Type fields and the User Info List fields soliciting non-legacy TB PPDUs may follow the Common Info for Specific TB Type fields and the User Info List fields soliciting legacy TB PPDUs.

With further reference to FIG. 7A, the Common Info for Specific TB Type fields may include common information for a specific TB Type (e.g., EHT TB, EHT-NG TB, etc.). In some embodiments, common information for a specific TB type in the Common Info for Specific TB Type fields may indicate octets from a Length field until a next Common Info for Specific TB Type field of an end of the trigger frame. In such an embodiment, the Common Info for Specific Trigger TB Type fields and the User Info List for Specific TB Type fields pairs can be in any order. As an example, one specific order may be that a non-legacy pair of Common Info for Specific TB Type fields and User Info List for Specific TB Type fields may be after a legacy pair of Common Info for Specific TB Type fields and User Info List for Specific TB Type fields. In another embodiment, common information for the specific TB type may indicate the number of the User Info List for Specific TB Type fields announced by the Common Info for specific TB Type fields, such that the number includes the Length field. In such an embodiment, the non-legacy pair of Common Info for Specific TB Type fields and User Info List for Specific TB Type fields may be after the legacy pair of Common Info for Specific TB Type fields and User Info List for Specific TB Type fields. In some embodiments, common information for the specific TB type in the Common Info for Specific TB Type fields may include the specific TB type field (e.g., EHT TB, NG-EHT TB, etc.). In some embodiments, common information for a specific TB type in the Common Info for Specific TB Type fields may include bandwidth information (e.g., start 20 MHz channel). In such an embodiment, another option may be that bandwidth information for a specific TB PPDU can be carried in a Common Info field so that length may not be needed. In some embodiments, common information for the specific TB type in the Common Info for Specific TB Type fields may include common fields for specific TB type.

According to a second EHT trigger frame option, a trigger frame may reuse a HE trigger frame format, such that the IEEE 802.11ax communication protocol values are used in the Trigger Type subfield. In some embodiments, the second EHT trigger frame option may be able to trigger at least one of an UL HE PPDU, an EHT PPDU, a HE A-PPDU, and an EHT A-PPDU. In some embodiments, using the second EHT trigger frame option may involve reusing the HE Common Info field structure and User Info field structure for EHT generation devices. In some embodiments, using the second EHT trigger frame option may involve repurposing some bits to indicate information for different generation devices. In some embodiments, using the second EHT trigger frame format may involve restrictions on available bits. The second EHT trigger frame format is described in further detail below with reference to FIG. 7B.

FIG. 7B depicts another example of a trigger frame that may be used in accordance with an embodiment of the invention. In FIG. 7B, the trigger frame may be used by a first device operating according to an EHT communication protocol, such that the trigger frame may be transmitted to a second device operating according to at least one of a non-legacy communication protocol and a legacy communication protocol. With reference to FIG. 7B, one embodiment of the invention may involve a trigger frame, implemented as trigger frame 700-2, that includes a Frame Control field 702, a Duration field 704, a RA field 706, a TA field 708, a Common Info field 710, a Common Info for specific TB Type1 field 712-1, a Common Info for specific TB Type2 field 712-2, a User Info List for Specific TB Type1 field 714-1 that includes at least one User Info field (not shown), a User Info List for Specific TB Type2 field 714-2 that includes at least one User Info field (not shown), a repetition field 716, and an FCS field 718. In some embodiments, Common Info for Specific TB Type fields (e.g., Common Info for specific TB Type1 field 712-1 and Common Info for specific TB Type2 field 712-2) follow the Common Info field 710. In such an embodiment, an additional restriction could be the Common Info for Specific TB Type fields soliciting non-legacy TB PPDUs follow the Common Info for Specific TB Type fields soliciting legacy TB PPDUs. In some embodiments, User Info fields that solicit the specific TB PPDUs (e.g., User Info List for Specific TB Type1 field 714-1 and User Info List for Specific TB Type2 field 714-2) follow the Common Info for Specific TB Type fields. In such an embodiment, another restriction could be that the User Info fields soliciting non-legacy TB PPDUs follow the User Info fields soliciting legacy TB PPDUs.

According to a third EHT trigger frame option, a trigger frame may include a cascaded trigger frame format. In some embodiments, the cascading trigger frame format may include a cascading HE trigger frame, a cascading EHT trigger frame, and a cascading trigger frame for next-generation devices. In some embodiments, the cascaded trigger frame may trigger at least one of an UL HE A-PPDU, an EHT A-PPDU, and an EHT+A-PPDU. In some embodiments, the cascaded trigger frame may support various trigger frame formats for each generation of devices. The various trigger frame formats of the third EHT trigger frame option are described in further detail below with reference to FIGS. 8A, 8B, FIGS. 9A, 9B, and FIG. 10.

FIG. 8A depicts another example of a trigger frame that may be used in accordance with an embodiment of the invention. In FIG. 8A, the trigger frame may be used by a first device operating according to an EHT communication protocol, such that the trigger frame may be transmitted to a second device operating according to at least one of a non-legacy communication protocol and a legacy communication protocol. With reference to FIG. 8A, one embodiment of the third EHT trigger frame option may involve a trigger frame, implemented as trigger frame 800, such that the trigger frame 800 is a cascading trigger frame that may be used as an HE trigger frame, an EHT trigger frame, and as next-generation trigger frames. In some embodiments, trigger frame 800 includes a Frame Control field 802, a Duration field 804, a RA field 806, a TA field 808, a HE Common Info field 810, a HE User Info List field 812 that includes at least one User Info field (not shown), a HE Delimiter field 814, an EHT Common Info field 816, an EHT User Info List field 818 that includes at least one User Info field (not shown), an EHT+ Common Info field 820, an EHT+ User Info List field 822 that includes at least one User Info field (not shown), a repetition field 824, and an FCS field 826.

With reference to FIG. 8A, the trigger frame 800 may include an HE section, an EHT section, and an EHT+ section. In some embodiments, the HE section of the trigger frame may include the HE Common Info field 810, the HE User Info List field 812, and the HE Delimiter field 814, in which a "delimiter" subfield (not shown) may be inserted to spoof HE STAs that the HE Delimiter 814 is the end of a valid user info block. In such an embodiment, a 12-bit all "1" AID12 (i.e., AID12=4095) may be inserted, allowing HE STAs to know that a searched AID12=4095 is the end of an HE trigger. In addition, an EHT STA and an EHT+ STA will know a new PPDU type is starting. In some embodiments, for a 40-bit user info block with AID12=4095, 28-bits of the 40-bit user info block can be used to signal EHT Common Info. In some embodiments, signaling EHT Common Info may involve a separate field after the HE "delimiter". In some embodiments, signaling EHT Common Info may be implemented within the 28-bits of the 40-bit HE "delimiter" user info block, such that some reserved bits in the HE Common Info may also be repurposed to signal a part of the EHT Common Info. In some embodiments, the EHT section of the trigger frame may include the EHT Common Info field 816 and the EHT User Info List field 818. In some embodiments, the EHT+ section of the trigger frame may include the EHT+ Common Info field 820 and the EHT+ User Info List field 822. For the EHT section and the EHT+ section of the trigger frame, the trigger frame may include a PHY identifier that is 3-bits. In addition, the ending of the EHT section and the EHT+ section may be signaled by either (i) explicitly defining a subfield in the Common Info field (e.g., number of user info blocks or number of bits/octets/word), or (ii) inserting another reserved AID value at the end of the EHT section and the end of the EHT+ section (e.g., AID12=4094 for EHT, AID12=4037-4087 for other EHT+ generations). In one embodiment, the EHT section and the EHT+ section may also include common information, such that the common information may include all needed information for the EHT section Common Info and the EHT+ section Common Info. In another embodiment, shared subfields with HE common info (e.g., UL Length, More TF, CS required, GI-LTF, LTF mode, NLTF, LDPC Extra Symbol, AP Tx power, Doppler, etc.) may not need to exist in the EHT Common Info section and the EHT+ Common Info section.

FIG. 8B depicts another example of a trigger frame that may be used in accordance with an embodiment of the invention. In FIG. 8B, the trigger frame may be used by a first device operating according to an EHT communication protocol, such that the trigger frame may be transmitted to a second device operating according to at least one of a non-legacy communication protocol and a legacy communication protocol. With reference to FIG. 8B, one embodiment of the third EHT trigger frame option may involve a trigger frame, implemented as trigger frame 800-1, such that the trigger frame 800-1 is a cascading trigger frame that may be used as a non-HE trigger frame. In such an embodiment, if no STAs are triggered to transmit a HE PPDU, the non-HE trigger frame may not include an HE User Info List field. In some embodiments, trigger frame 800-1 includes a Frame Control field 802, a Duration field 804, a RA field 806, a TA field 808, a HE Common Info field 810, a HE Delimiter field 814, an EHT Common Info field 816, an EHT User Info List field 818 that includes at least one User Info field (not shown), an EHT+ Common Info field 820, an EHT+ User Info List field 822 that includes at least one User Info field (not shown), a repetition field 824, and an FCS field 826. In another embodiment of the third EHT trigger frame option, a trigger frame, implemented as trigger frame 800-2, may combine the HE Delimiter field and the EHT Common Info field. In such an embodiment, the trigger frame 800-2 includes a Frame Control field 802, a Duration field 804, a RA field 806, a TA field 808, a HE Common Info field 810, a HE Delimiter+EHT Common Info field 815, an EHT User Info List field 818, an EHT+ Common Info field 820, an EHT+ User Info List field 822, a repetition field 824, and an FCS field 826.

With reference to FIG. 8B, the trigger frame 800-1 or the trigger frame 800-2 may use one or more bits to indicated that the trigger frame 800-1 or the trigger frame 800-2 has a cascaded EHT section and an EHT+ section. In one embodiment, the trigger frames may repurpose one or more bits (e.g., the Reserved bit) in the HE Common Info field 810 to indicate the existence of an EHT section or an EHT+ section. In another embodiment, the trigger frames may use one or more bits after the HE Delimiter field 814 in trigger frame 800-1 or the HE Delimiter+EHT Common Info field 815 in trigger frame 800-2. In such an embodiment, the one or more bits after the "HE Delimiter" fields can differentiate true HE trigger frame padding from the "HE Delimiter", allowing an EHT STA to be unaffected.

Figure 9A:
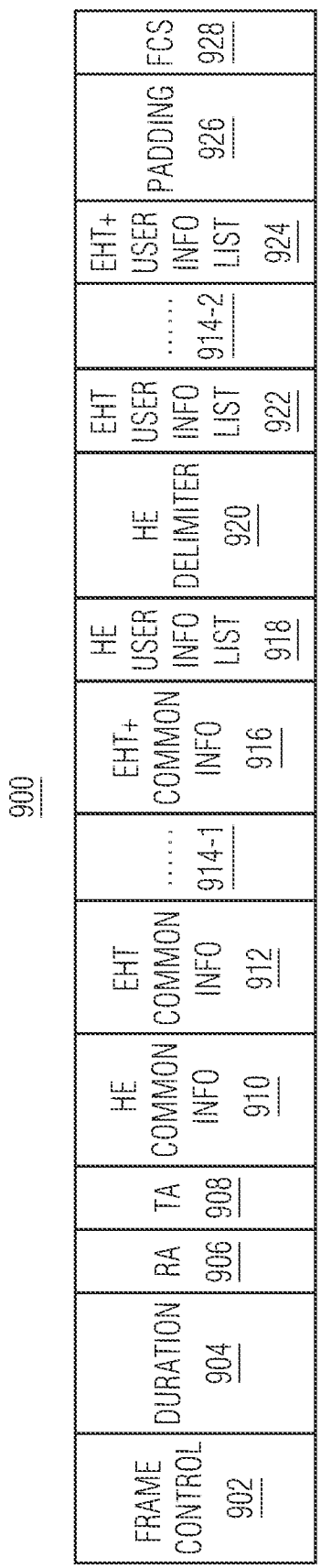
FIG. 9A depicts another example of a trigger frame that may be used in accordance with an embodiment of the invention.

FIG. 9A depicts another example of a trigger frame that may be used in accordance with an embodiment of the invention. In FIG. 9A, the trigger frame may be used by a first device operating according to an EHT communication protocol, such that the trigger frame may be transmitted to a second device operating according to at least one of a non-legacy communication protocol and a legacy communication protocol. With reference to FIG. 9A, one embodiment of the third EHT trigger frame option may involve a trigger frame, implemented as trigger frame 900, such that the trigger frame 900 is a cascading trigger frame that may be used as an HE trigger frame, an EHT trigger frame, and as a next-generation trigger frame that separates Common Info and User Info. For example, the trigger frame 900 includes a Frame Control field 902, a Duration field 904, a RA field 906, a TA field 908, a HE Common Info field 910, an EHT Common Info field 912, a first repetition field 914-1, an EHT Common Info field 916, a HE User Info List field 918 that includes at least one User Info field (not shown), a HE Delimiter field 920, an EHT User Info List field 922 that includes at least one User Info field (not shown), a second repetition field 914-2, an EHT+ User Info List field 924 that includes at least one User Info field (not shown), a Padding field 926, and an FCS field 928. In such an embodiment, Common Info fields (e.g., HE Common Info field 912, EHT Common Info field 912, EHT Common Info field 916) are cascaded and followed by cascaded User Info List fields (e.g., HE User Info List field 918, EHT User Info List field 922, EHT+ User Info List field 924) for each generation (e.g., HE, EHT, or EHT+). In such an embodiment, when each generation (e.g., HE, EHT, or EHT+) is separated, the EHT Common Info field 912 or the EHT+ Common Info field 916 may be embedded into the HE User Info List field 922, such that each new generation's (e.g., HE, EHT, or EHT+) Common Info can be signaled using one or more HE User Info List fields, and further involves a special AID subfield being reserved for each generation (e.g., HE, EHT, or EHT+). In addition, the end of the HE User Info List field 918 may be followed by a delimiter (e.g., 11-bit all "1" sequence (e.g., 4096), a user info block with AID 4095), while the EHT User Info List field 922 and the EHT+ User Info List field 925 may add (i) a delimiter for each generation, such that the delimiter is the same size as an AID subfield or user info block size, or (ii) an indication in a Common Info field for the number of users or user info size (e.g., Nbits, Nbytes, or Nwords) for each generation.

Figure 9B:
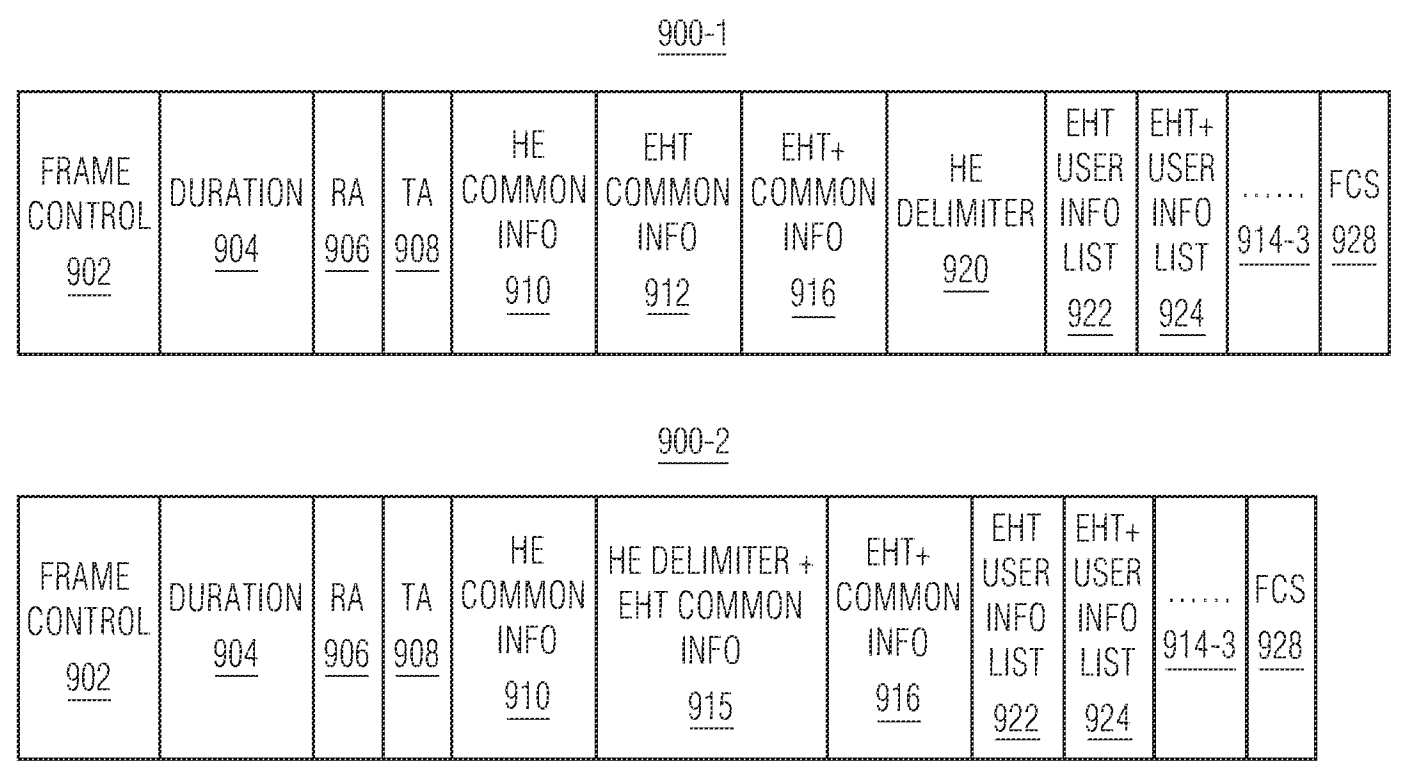

FIG. 9B depicts another example of a trigger frame that may be used in accordance with an embodiment of the invention. In FIG. 9B, the trigger frame may be used by a first device operating according to an EHT communication protocol, such that the trigger frame may be transmitted to a second device operating according to at least one of a non-legacy communication protocol and a legacy communication protocol. With reference to FIG. 9B, one embodiment of the third EHT trigger frame option may involve a trigger frame, implemented as trigger frame 900-1, such that the trigger frame 900-1 is a cascading trigger frame that may be used as a non-HE trigger frame. In such an embodiment, if no STAs are triggered to transmit a HE PPDU, the non-HE trigger frame may not include an HE User Info List field. In some embodiments, trigger frame 900-1 includes a Frame Control field 902, a Duration field 904, a RA field 906, a TA field 908, a HE Common Info field 910, an EHT Common Info field 912, an EHT+ Common Info field 916, a HE Delimiter field 920, an EHT User Info List field 922 that includes at least one User Info field (not shown), an EHT+ User Info List field 924 that includes at least one User Info field (not shown), a repetition field 914-3, and an FCS field 928. In another embodiment of the third EHT trigger frame option, a trigger frame, implemented as trigger frame 900-2, may combine the HE Delimiter field and the EHT Common Info field. In such an embodiment, the trigger frame 900-2 includes a Frame Control field 902, a Duration field 904, a RA field 906, a TA field 908, a HE Common Info field 910, a HE Delimiter+ EHT Common Info field 915, an EHT+ Common Info field 916, an EHT User Info List field 922 that includes at least one User Info field (not shown), an EHT+ User Info List field 924 that includes at least one User Info field (not shown), a repetition field 914-3, and an FCS field 928.

Figure 10:
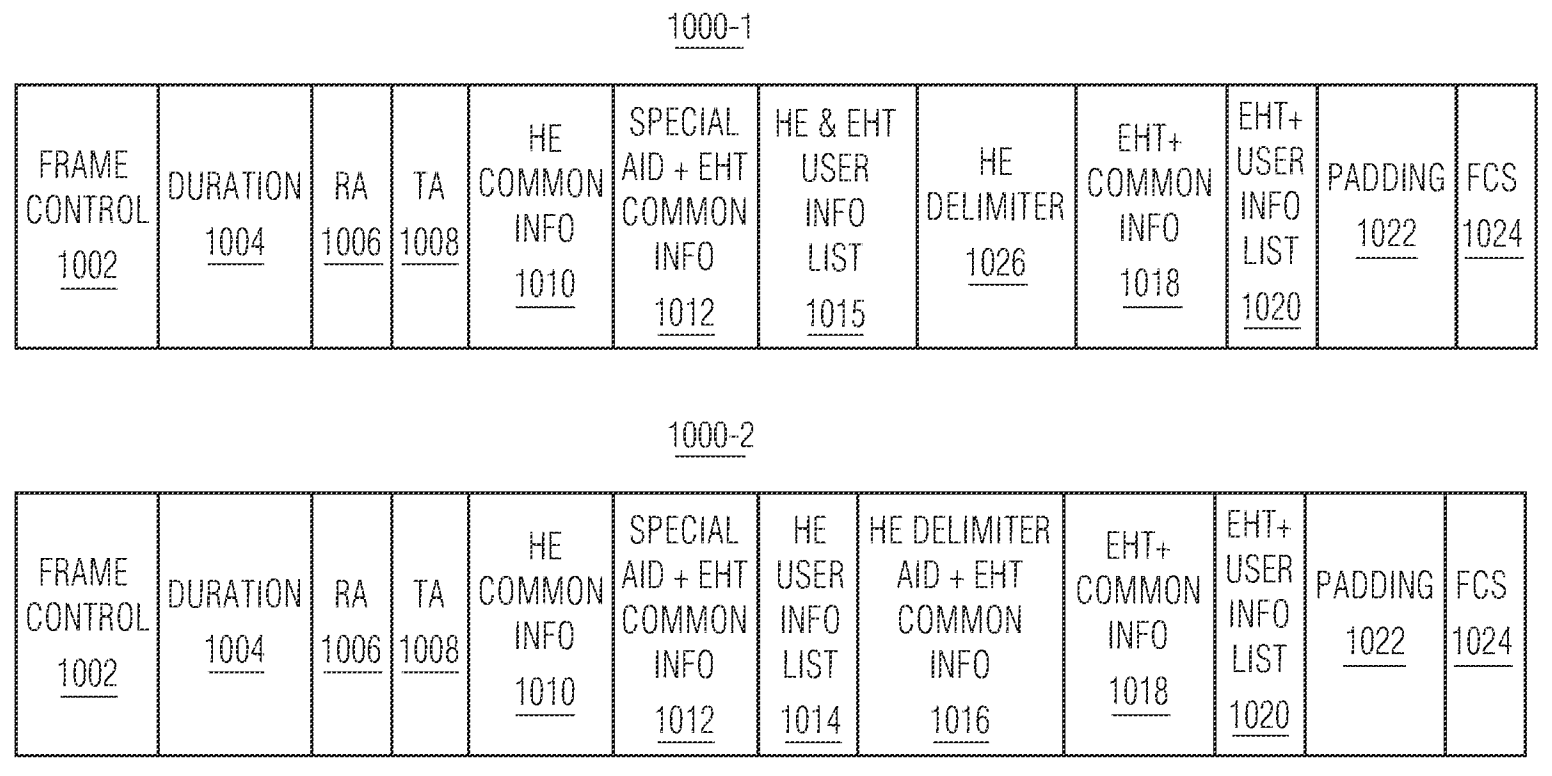

FIG. 10 depicts another example of a trigger frame that may be used in accordance with an embodiment of the invention. In FIG. 10, the trigger frame may be used by a first device operating according to an EHT communication protocol, such that the trigger frame may be transmitted to a second device operating according to at least one of a non-legacy communication protocol and a legacy communication protocol. With reference to FIG. 10, one embodiment of the third EHT trigger frame option may involve a trigger frame, implemented as trigger frame 1000-1, such that the trigger frame 1000-1 is a cascading trigger frame that may be used as an HE trigger frame, an EHT trigger frame, and as next-generation trigger frames that separate Common Info and User Info. For example, the trigger frame 1000-1 includes a Frame Control field 1002, a Duration field 1004, a RA field 1006, a TA field 1008, a HE Common Info field 1010, a Special AID+EHT Common Info field 1012, a HE and EHT User Info List field 1015 that includes at least one User Info field (not shown), a HE Delimiter field 1026, an EHT+ Common Info field 1018, an EHT+ User Info List field 1020 that includes at least one User Info field (not shown), a Padding field 1022, and an FCS field 1024. In the trigger frame 1000-1, the EHT Common Info field follows immediately after the HE Common Info field. In another embodiment of the third EHT trigger frame option, a trigger frame, implemented as trigger frame 1000-2, may separate the HE and EHT User Info List field. In such an embodiment, the trigger frame 1000-2 includes a Frame Control field 1002, a Duration field 1004, a RA field 1006, a TA field 1008, a HE Common Info field 1010, a HE User Info List field 1014 that includes at least one User Info field (not shown), a HE Delimiter AID+EHT Common Info field 1028, an EHT User Info List field 1016 that includes at least one User Info field (not shown), an EHT+ Common Info field 1018, an EHT+ User Info List field 1020 that includes at least one User Info field (not shown), a Padding field 1022, and an FCS field 1024. In the trigger frame 1000-2, the EHT Common Info is embedded in a user block with all "1" AID (delimiter) and that follows after all HE User Info List fields.

With reference to FIG. 10, the trigger frame 1000-1 and the trigger frame 1000-2 may merge a HE section and an EHT section, in which the HE section and the EHT section are followed by a delimiter and next-generation sections. In some embodiments, the EHT Common Info field is embedded into one HE User Info List field with a special AID (not shown). In such an embodiment, each EHT User Info List field may have the same size and the same structure, in which the special AID (e.g., AID12) is at the beginning. In one embodiment of the trigger frame 1000-1, one reserved bit in the HE and EHT User Info List field 1015 may be repurposed to indicate whether or not the block is for an EHT device. In some embodiments of the trigger frame 1000-2, there may be no need for a special bit in a user info block because the HE User Info List field 1014 and the EHT User Info List field 1016 are separate. In such an embodiment, the trigger frame 1000-2 may save one HE Delimiter and may add 1-bit in the HE Common Info field 1010 to indicate whether there is an EHT cascading section.

When multiple trigger frames are used in a downlink (DL) OFDMA transmission to solicit TB A-PPDU, a trigger frame may announce the RU allocation and TB PPDU of a channel and solicit a single TB PPDU. As an example, such a trigger frame may be used when soliciting a HE TB PPDU and an EHT TB PPDU in a 320 MHz mixed UL OFDMA. In some embodiments, a first trigger (e.g., Trigger1) in a DL OFDMA announces the RU allocation and TB PPDU of a first 80 MHz channel (e.g., 80 MHz channel1), such that the 80 MHz channel1 is an 80 MHz NG-EHT OFDMA channel. In some embodiments, a second trigger (e.g., Trigger2) in a DL OFDMA announces the RU allocation and TB PPDU of a second 80 MHz channel (e.g., 80 MHz channel2), such that the 80 MHz channel2 is an 80 MHz HE OFDMA channel. In some embodiments, a third trigger (e.g., Trigger3) in a DL OFDMA announces the RU allocation and TB PPDU of a third 80 MHz channel (e.g., 80 MHz channel3), such that the 80 MHz channel3 is an 80 MHz EHT OFDMA channel. In some embodiments, a fourth trigger (e.g., Trigger4) in a DL OFDMA announces the RU allocation and TB PPDU of a fourth 80 MHz channel (e.g., 80 MHz channel4), such that the 80 MHz channel4 is an 80 MHz HE OFDMA channel.

Figure 11:
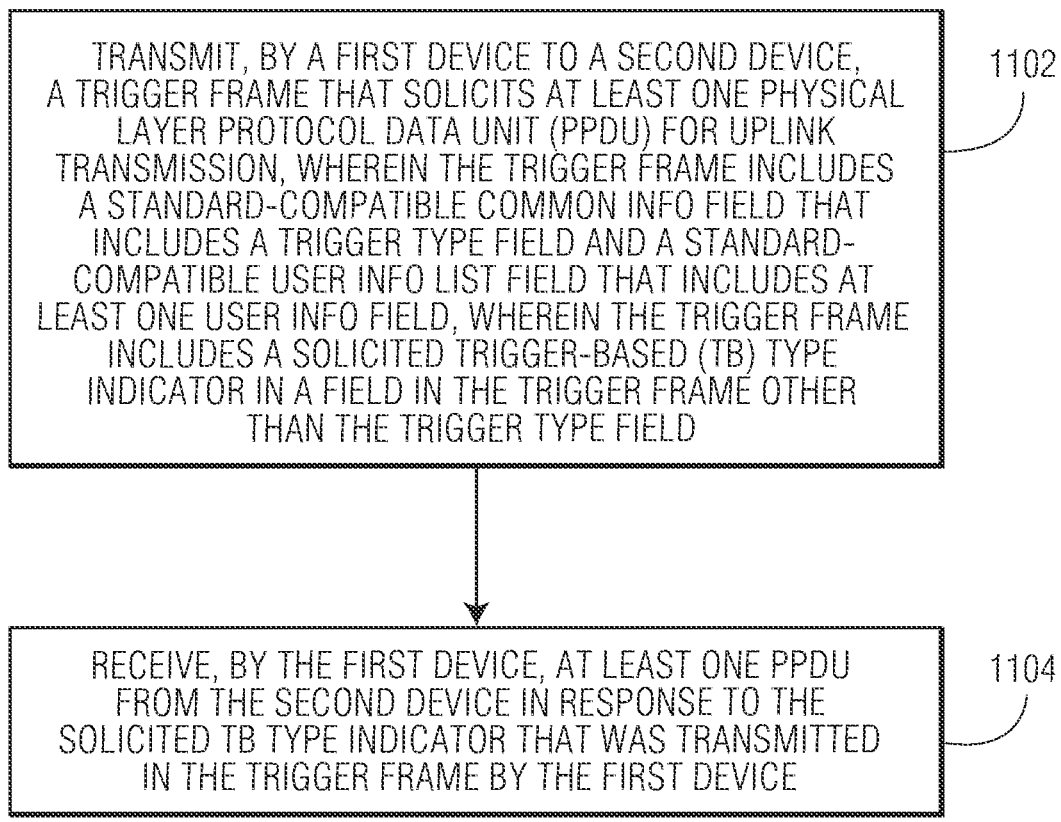
FIG. 11 illustrates a flow diagram of a technique for transmitting a trigger frame that may be used in accordance with an embodiment of the invention.

A technique for transmitting a trigger frame that can be used in accordance with an embodiment of the invention is described with reference to a flow diagram of FIG. 11. At block 1102, a first device transmits, to a second device, a trigger frame that solicits at least one PPDU for uplink transmission, such that the trigger frame includes a standard-compatible common info field that includes a trigger type field and a standard-compatible user info list field that includes at least one user info field, such that the trigger frame includes a solicited TB type indicator in a field in the trigger frame other than the trigger type field. At block 1104, the first device receives at least one PPDU from the second device in response to the solicited TB type indicator that was transmitted in the trigger frame by the first device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for communications, the method comprising:
at a first device, transmitting, to a second device, a trigger frame that solicits at least one Physical layer Protocol Data Unit (PPDU) for uplink transmission,
wherein the trigger frame includes a standard-compatible common info field that includes a trigger type field and a standard-compatible user info list field that includes at least one user info field,
wherein the trigger frame includes a solicited Trigger-Based (TB) type indicator in a field in the trigger frame other than the trigger type field; and
receiving, at the first device, at least one PPDU from the second device in response to the solicited TB type indicator that was transmitted in the trigger frame by the first device.

2. The method of claim 1, wherein the trigger frame uses a High-Efficiency (HE) trigger frame format.

3. The method of claim 2, wherein a reserved field of the standard-compatible common info field indicates that the first device solicits an Extremely High Throughput (EHT) TB PPDU.

4. The method of claim 2, wherein a specific association identifier (AID) value of an AID subfield of the standard-compatible user info field announces solicited PPDU formats.

5. The method of claim 4,
wherein the standard-compatible user info field with the specific AID value of the AID12 subfield is used to carry common information for multiple solicited devices;
wherein, the specific AID value of the AID12 subfield is 2007; and
wherein, an uplink (UL) High Efficiency (HE) Signal-A2 (UL HE-SIG-A2) Reserved subfield is used to carry common information different from a reserved value for multiple solicited devices.

6. The method of claim 5,
wherein the standard-compatible user info field with the specific AID value of the AID12 subfield carries an Extremely High Throughput (EHT) signal (SIG) value of the solicited EHT TB PPDU.

7. The method of claim 2,
wherein an uplink (UL) High Efficiency (HE) Signal-A2 (UL HE-SIG-A2) Reserved subfield of the standard-compatible common info field announces PPDU formats.

8. The method of claim 1,
wherein the standard-compatible user info field comprises a Resource Unit (RU) allocation that uses 9-bits for signaling at least one of a one RU and multiple RUs for the second device(s).

9. The method of claim 8,
wherein 1-bit of the 9-bits indicates whether the RU is in at least one of a primary 160 MHz (MegaHertz) channel and a secondary 160 MHz channel if the solicited PPDU is more than 160 MHz.

10. The method of claim 8,
wherein 1-bit of the 9-bits indicates whether the RU is in at least one of a primary 80 MHz (MegaHertz) channel and a secondary 80 MHz channel; and
wherein, if the RU is in the secondary 160 MHz channel, a location infrequency of the primary 80 MHz channel and the secondary 80 MHz channel is the same as a location of the primary 80 MHz channel and the secondary 80 MHz channel of the primary 160 MHz channel.

11. The method of claim 8, wherein 1-bit of the 9-bits indicates whether a wider RU is in at least one of the primary 160 MHz (MegaHertz) channel and the secondary 160 MHz channel if multiple RUs for a single device covering at least one of the primary 160 MHz channel and the secondary 160 MHz channel are allocated to the single device.

12. The method of claim 8, wherein 1-bit of the 9-bits indicates whether a wider RU is in at least one of the primary 80 MHz (MegaHertz) channel and the secondary 80 MHz channel if multiple RUs for the single device covering at least one of the primary 80 MHz channel and the secondary 80 MHz channel are allocated to the single device.

13. The method of claim 1, wherein if an HE TB PPDU and a TB PPDU other than the HE TB PPDU are solicited by the trigger frame, the standard-compatible common info field announces common information for the HE TB PPDU and the standard-compatible user info field with a specific association identifier (AID) value of an AID12 subfield announces common information for the TB PPDU other than the HE TB PPDU.

14. The method of claim 1, wherein if multiple TB PPDUs with different TB types are solicited by the Trigger frame, the standard-compatible common info field announces the frequency location if different TB types are present.

15. The method of claim 1, wherein if multiple TB PPDUs with different TB types are solicited by the trigger frame, the standard-compatible user info field with a specific association identifier (AID) value of an AID12 subfield that solicits the TB PPDU from the second device with Extremely High Throughput (EHT) TB type is placed before the standard-compatible user info field with the specific AID12 value that solicits TB PPDU from second devices with next-generation (NG) EHT TB type.

16. A first device, the first device comprising:
a processor configured to:
  transmit, to a second device, a trigger frame that solicits at least one Physical layer Protocol Data Unit (PPDU) for uplink transmission,
  wherein the trigger frame includes a standard-compatible common info field that includes a trigger type field and a standard-compatible user info list field that includes at least one user info field,
  wherein the trigger frame includes a solicited Trigger-Based (TB) type indicator in a field in the trigger frame other than the trigger type field; and
  receive at least one PPDU from the second device in response to the solicited TB type indicator that was transmitted in the trigger frame by the first device.

17. A method for multi-link communications, the method comprising:
  at a first device, formatting a trigger frame that solicits at least one of a Trigger-Based (TB) Aggregated-Physical layer Protocol Data Unit (PPDU) and a PPDU for uplink transmission,
  wherein the trigger frame includes a standard-compatible common info field for a specific TB type and a standard-compatible user info list field for a specific TB type,
  wherein the trigger frame includes a solicited Trigger-Based (TB) type indicator in a field in the trigger frame other than the trigger type field;
  transmitting, to a second device, the trigger frame that solicits at least one of the TB A-PPDU (Aggregated-PPDU) and the PPDU for uplink transmission; and
  receiving, at the first device, at least one PPDU from the second device in response to the solicited TB type indicator that was transmitted in the trigger frame by the first device.

18. The method of claim 17, wherein formatting the trigger frame includes using an Extremely High Throughput (EHT) trigger frame format.

19. The method of claim 17, wherein formatting the trigger frame includes reusing a HE trigger frame format.

20. The method of claim 17, wherein formatting the trigger frame includes using a cascaded trigger frame format.

* * * * *